(12) United States Patent
McNeil et al.

(10) Patent No.: US 12,141,810 B2
(45) Date of Patent: Nov. 12, 2024

(54) INTERACTIVE HELP DESK SYSTEM

(71) Applicant: Vendera Mobile, Houston, TX (US)

(72) Inventors: Casey McNeil, Houston, TX (US); Luke Waier, Houston, TX (US)

(73) Assignee: Vendera Mobile, Houston, TX (US)

( * ) Notice: Subject to any disclaimer, the term of this patent is extended or adjusted under 35 U.S.C. 154(b) by 167 days.

(21) Appl. No.: 16/810,024

(22) Filed: Mar. 5, 2020

(65) Prior Publication Data

US 2021/0279739 A1    Sep. 9, 2021

(51) Int. Cl.
*G06Q 30/016* (2023.01)
*H04L 65/1069* (2022.01)
*G06N 5/04* (2023.01)

(52) U.S. Cl.
CPC ....... *G06Q 30/016* (2013.01); *H04L 65/1069* (2013.01); *G06N 5/04* (2013.01)

(58) Field of Classification Search
CPC ..... G06Q 30/016; G06N 5/04; H04L 65/1069
See application file for complete search history.

(56) References Cited

U.S. PATENT DOCUMENTS

| | | | | |
|---|---|---|---|---|
| 6,885,998 B1 * | 4/2005 | Arduino | .................. | G06Q 10/02 705/26.81 |
| 7,912,767 B1 * | 3/2011 | Cheatham | ............ | G06Q 40/123 705/31 |
| 10,708,419 B1 * | 7/2020 | Talbot | .................. | H04M 3/4211 |
| 10,929,261 B1 * | 2/2021 | Levin | .................... | H04L 67/125 |
| 2009/0222318 A1 * | 9/2009 | Anelevitz | ............ | G06Q 30/016 705/1.1 |
| 2010/0228676 A1 | 9/2010 | Librizzi et al. | | |
| 2011/0301738 A1 * | 12/2011 | Freeman | ................. | G07F 17/26 700/106 |
| 2011/0313937 A1 * | 12/2011 | Moore, Jr. | ......... | G07C 9/00896 235/382 |
| 2013/0191170 A1 * | 7/2013 | Jarrett | .................... | G06Q 40/08 705/4 |
| 2013/0198144 A1 * | 8/2013 | Bowles | .................. | G06Q 10/30 707/668 |
| 2014/0316916 A1 * | 10/2014 | Hay | ....................... | G06Q 20/20 705/17 |
| 2014/0324610 A1 * | 10/2014 | Ans | ..................... | G06Q 20/1085 705/21 |
| 2014/0351075 A1 * | 11/2014 | D'Argenio | ......... | G06Q 30/0621 705/26.5 |

(Continued)

*Primary Examiner* — Dhairya A Patel
(74) *Attorney, Agent, or Firm* — McGuire Woods LLP

(57) ABSTRACT

A variety of systems and methods are disclosed, a method comprising connecting a user, operating a kiosk, and a service specialist, operating a service specialist station, such that the service specialist is capable of supporting the user in servicing an electronic device from a remote location, the method comprising: engaging a portion of the kiosk; establishing a two-way communication connection between the kiosk and the service specialist station thereby allowing the user and the service specialist to interact in real time; allowing the service specialist to inspect the electronic device; determining a service the electronic device needs based on the results of the service specialists inspection; and servicing the device, wherein the service specialist guides the user through steps required for performing the determined service on the electronic device via step-by-step instructions.

18 Claims, 3 Drawing Sheets

(56) References Cited

U.S. PATENT DOCUMENTS

| | | | | |
|---|---|---|---|---|
| 2015/0046514 A1* | 2/2015 | Madan | ................... | H04L 67/10 |
| | | | | 709/203 |
| 2015/0052452 A1* | 2/2015 | Alekhin | ................ | H04L 65/403 |
| | | | | 715/753 |
| 2016/0284019 A1* | 9/2016 | Bowles | ............. | G06Q 30/0278 |
| 2017/0286920 A1 | 10/2017 | Silva et al. | | |
| 2019/0066073 A1* | 2/2019 | Yen | ...................... | G06Q 30/016 |
| 2020/0184531 A1* | 6/2020 | Yen | ........................ | G06Q 10/08 |
| 2020/0202319 A1* | 6/2020 | Forutanpour | ....... | H04M 15/715 |
| 2020/0258343 A1* | 8/2020 | Forutanpour | ....... | G07F 17/0014 |
| 2021/0192484 A1* | 6/2021 | Forutanpour | ........ | G06Q 20/203 |
| 2021/0209536 A1* | 7/2021 | Reuveni | .......... | G06Q 10/06316 |
| 2021/0279739 A1* | 9/2021 | McNeil | ............... | H04L 65/1069 |
| 2021/0334765 A1* | 10/2021 | Nottingham | ............ | G06F 21/34 |
| 2022/0027879 A1* | 1/2022 | Bowles | ................... | G07F 7/06 |
| 2024/0185317 A1* | 6/2024 | Forutanpour | .... | G06K 19/06028 |

* cited by examiner

INTERACTIVE HELP DESK SYSTEM

BACKGROUND

It may be desired for a company to provide hands-on information technology support to all users. Many companies have thousands of users located across several locations. Without having a dedicated person in each office capable of managing this support, providing this type of hands on support may not be feasible. Providing hands-on information technology support across a wide range of users may be advantageous for several reasons.

BRIEF DESCRIPTION OF THE DRAWINGS

These drawings illustrate certain aspects of some of the present disclosure, and should not be used to limit or define the disclosure.

DETAILED DESCRIPTION

The present disclosure may be directed to an interactive help desk system capable of connecting a user with a service specialist remotely located, in real-time, to provide the user with information technology support and/or device replacement support in a one on one interactive manner. First the user may interact with an appointment management system supported by the network to schedule an appointment. The user may check-in for their appointment by engaging a portion of a kiosk. The user may then be placed in a virtual queue supported by the network and a service specialist may be notified of the appointment. The service specialist may then accept the pending appointment and a two-way connection may be established between a kiosk operated by a user and a service specialist station operated by a service specialist. The service specialist may then provide information technology support and/or device replacement support to the user in real-time. The present disclosure may be used in a variety of applications and should not be limited herein. The interactive help desk system may be described in more detail below.

Figure 1:
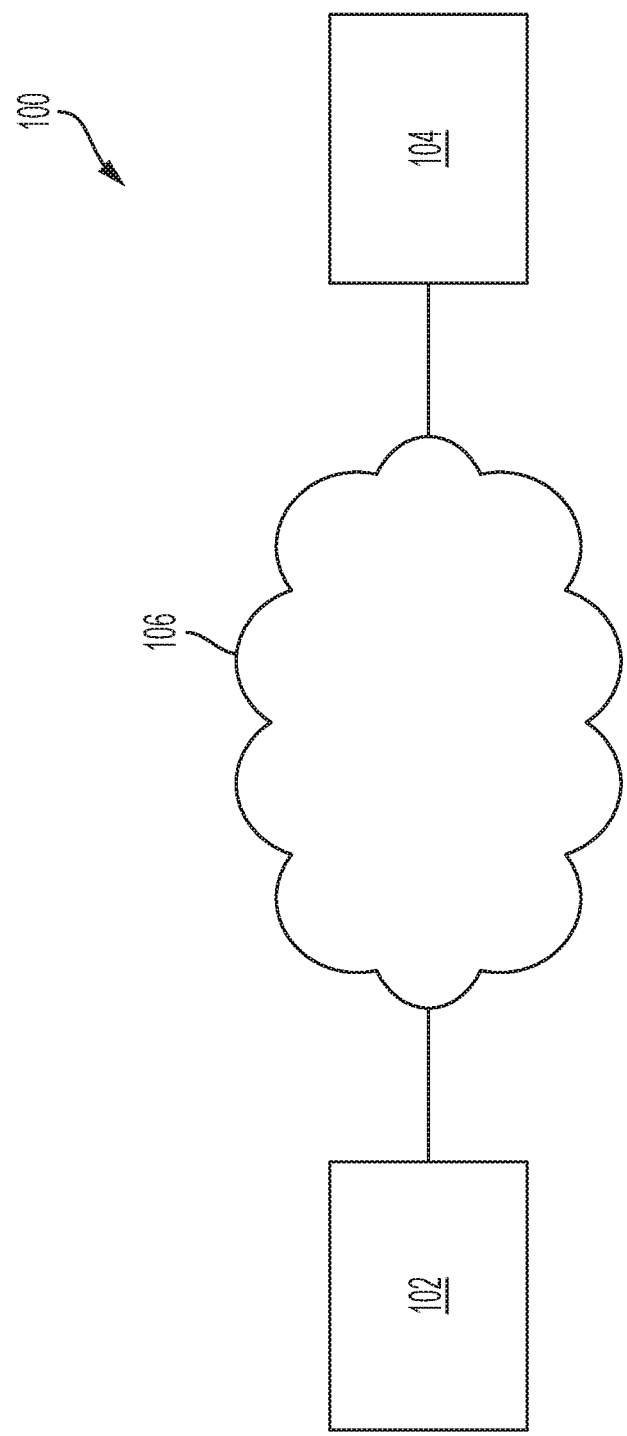
FIG. 1 illustrates an embodiment of an interactive help desk system.

FIG. 1 illustrates an embodiment of an interactive help desk system 100. The interactive help desk system 100 may comprise a kiosk 102, which may be connectable to a service specialist station 104 over a network 106. The kiosk 102 may be located in a variety of locations including, but not limited to, an office building, an employee accessible common area, a store, a warehouse, a company facility, the like, or any combinations thereof. In certain embodiments, kiosk 102 may be a permanent or semi-permanent structure. As used here in, "permanent" may refer to a kiosk system disposed in a single location and may not be moved there from. As used herein, "semi-permanent" may refer to a kiosk that may be disposed in a single location, but may be relocated to a different location after a given time period. Although the interactive help desk system 100 is shown with a single kiosk 102, it may be recognized that the system may include a plurality of kiosks 102, each communicably connectable to a service specialist station 104 or a plurality of service specialist stations 104 over a network 106. Service specialist station 104 may be located at any remote location relative to the kiosk. The location of service specialist station 104 should not be limited herein.

Service specialist station 104 may provide the user with information technology support and/or device replacement support in a one on one interactive manner. By one on one, it is meant that one or more service specialists may be located at the service specialist station 104 to provide input to the user and one or more users may be located at the kiosk 102 to participate in an appointment with the service specialist station 104. In an embodiment, the kiosk 102 may be in communication with a particular service specialist station 104. Alternatively, the kiosk 102 may be in communication with two or more service specialist stations 104. Any number of kiosks 102 and/or service specialist stations 104 may be used and should not be limited herein.

In certain embodiments, each service specialist station 104 may be remotely located from kiosk 102 and may be operated by a person capable of diagnosing IT related problems, troubleshooting IT related problems, repairing electronic devices, supporting electronic devices, configuring electronic devices, the like, and/or any combinations thereof.

The network 106 may be any type of communication network such as a public-switched telephone network (PSTN), the Internet, a wireless network (e.g. a cellular network), a private wide area network (WAN) or a private local area network (LAN). Network 106 may use any technology capable of permitting communication between kiosk 102 and service specialist stations 104. In an embodiment, network 106 may comprise an appointment management system. The appointment management system may perform a plurality of functions including, but not limited to, scheduling appointments, checking-in users for their appointments, placing users in a virtual que while they wait to connect with a service specialist, notifying a service specialist that the user is waiting in a virtual que, the like, and/or any combinations thereof. Any suitable appointment management system may be used and should not be limited herein. Optionally, an appointed onsite contact may be capable of setting an appointment for the user immediately, but may be dependent on the availability of an appointment. Optionally, the service specialist operating the service specialist station 104 may be capable of setting up an appointment directly with the user thereby by passing the appointment management system. Optionally, a user may comprise an access code that when entered into a kiosk 102, the user may be connected with a service specialist immediately, thereby bypassing the virtual que. Appointments may be set in any suitable manner and should not be limited herein.

In an embodiment, the system 100 may be used to connect one kiosk 102 to one service specialist station 104. Two-way audio and visual communication, such as a video conference, may be established between the user or users using the kiosk 102 and the service specialist at the service specialist station 104 in real-time. In an alternative embodiment, the system 100 may be used to connect a plurality of kiosks 102 to one service specialist station 104. In an alternative embodiment, the system 100 may be used to connect a plurality of kiosks 102 to a plurality of service specialist stations 104. In certain embodiments, each kiosk 102 of the plurality of kiosks 102 may comprise the same configuration or may comprise a different configuration. Each service specialist station of the plurality of service specialist stations 104 may comprise the same configuration or may comprise different configurations. When a user at kiosk 102 wants to communicate with a service specialist at service specialist station 104, the user may engage a portion of kiosk 102. The user may then be placed in a virtual queue and the appointment management system may then notify the service specialist of the pending appointment. The service specialist may then accept the appointments in the virtual queue according to a predetermined method. For example, the person at the service specialist station 104 may implement a first in first out (FIFO) methodology. Once the service specialist accepts a pending appointment, two-way communication may be established between the user at kiosk 102 and the service specialist at service specialist station 104. The service specialist may then provide information technology support and/or device replacement support to the user in real-time.

Once the two-way communication has been established, the service specialist may then utilize at least one device of kiosk 102 to inspect an electronic device (not shown). The electronic device may be placed on and/or held within an inspection area (referring to FIG. 2) of kiosk 102. The service specialist may utilize an interactive user interfacing device (referring to FIG. 2), an imaging device (referring to FIG. 2), a computing device (referring to FIG. 2), the like, and/or any combinations thereof to inspect the electronic device. The service specialist may visually and/or electronically inspect the electronic device. The service specialist may then determine the appropriate course of action. In certain embodiments, the service specialist may determine that the electronic device requires set up, the electronic device may be repaired at the kiosk, the electronic device may be replaced with a replacement device stored in kiosk 102, a portion of the electronic device may be replaced (e.g., a sim card), the like, and/or any combinations thereof. The service specialist may then provide step-by-step instructions to the user such that the user may accomplish the desired operation. Upon completion of the desired operation, the user and/or the service specialist may disengage the interactive help desk system 100 and the user and the service specialist may be disconnected. The interactive help desk system 100 may be used a variety of ways and should not be limited herein.

Figure 2:
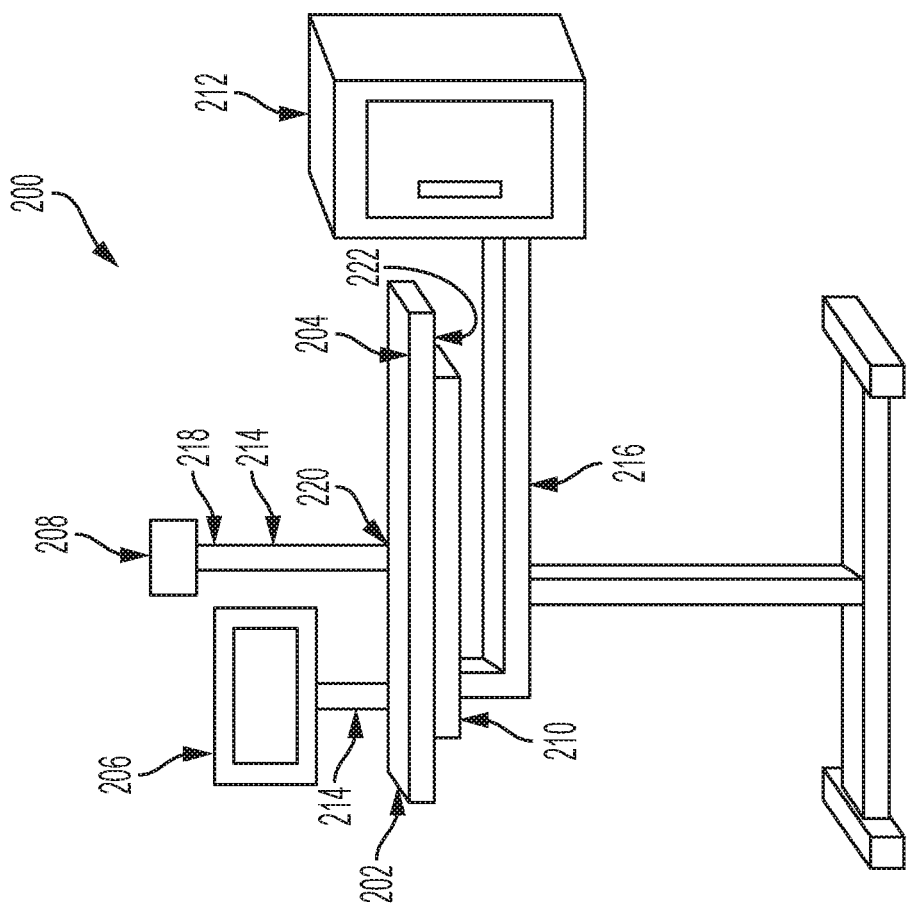
FIG. 2 illustrates an embodiment of a kiosk.

FIG. 2 illustrates an embodiment of kiosk 200. Kiosk 200 may comprise an inspection area 202. Inspection area 202 may be any hard surface with a defined area capable of disposing an electronic device on a top surface 204 of inspection area 202. Optionally, inspection area 202 may be any hard surface with a defined area capable of disposing a plurality of electronic devices adjacent to one another on a top surface 204 of inspection area 202. Inspection area 202 may be of any suitable size and should not be limited herein.

Inspection area 202 may be of any suitable geometry so long as there may be at least one face that may function as substantially flat horizontal surface. Suitable geometries may include, but are not limited to, cube, cuboid, hexagonal pyramid, tetrahedron, square pyramid, triangular prism, pentagonal prism, hexagonal prism, dodecahedron, cylinder, cone, truncated square pyramid, triangular pyramid, the like, and/or any combinations thereof.

Inspection area 202 may be formed of any suitable material capable of providing a rigid surface, wherein the material may not deform when an electronic device and/or a plurality of electronic devices may be placed thereon. Suitable materials may include, but are not limited to, natural materials, manufactured materials, composite materials, the like, and/or any combinations thereof. Suitable may include, but are not limited to wood, stone, granite, marble, quartz, polymeric materials, elastomeric materials, the like, and/or any combinations thereof. Inspection area 202 may be of any suitable color so long as the color may not negatively affect a service specialist's ability to view an electrical device disposed thereon.

In an embodiment, inspection area 202 may be disposed on base 216. Any suitable base 216 capable of physically supporting at least a portion of kiosk 200. In certain embodiments, the size of base 216 may be restricted be the location in which kiosk 200 may be deployed. Base 216 may be solid in form. Optionally, base 216 may be hollow in form, wherein electrical wires may be installed within an internal cavity of base 216.

In an embodiment, kiosk 200 may comprise a device or a plurality of devices that may be permanently or semi-permanently coupled to a support structure 214 and/or base 216 relative to inspection area 202. Suitable devices may include, but are not limited to, an interactive user interfacing device 206, an imaging device 208, a computing device 210, a vessel 212, the like, and/or any combinations thereof. A device or a plurality of devices may be coupled to support structure 214 and/or base 216 relative to inspection area 202 in any suitable manner and should not be limited herein. In an embodiment, support structure 214 may be a telescoping support structure 214, such that the position of support structure 214 may be manually adjusted by a user to a desired position for a given application. In certain embodiments, the size of support structure 214 may be restricted be the location in which kiosk 200 may be deployed. Support structure 214 may be solid in form. Optionally, support structure 214 may be hollow in form, wherein electrical wires from the components of kiosk 200 may be installed within an internal cavity of support structure 214.

In an non-limiting example, support structure 214 may comprise a distal end 218 and a proximal end 220. A device may be permanently or semi-permanently coupled to a distal end 218 of support structure 214. The device and the distal end 218 of support structure 214 may be coupled in any suitable manner and should not be limited herein. Proximal end 220 of support structure 214 may be permanently or semi-permanently coupled to a portion of inspection area 202. Optionally, the proximal end 220 of support structure 214 may be permanently or semi-permanently coupled to base 216. Proximal end 220 of support structure 214 may be coupled to inspection area 202 and/or base 216 in any suitable manner and should not be limited herein. In an embodiment, a device may be permanently or semi-permanently coupled to base 216 in any suitable manner and should not be limited herein.

Kiosk 200 may comprise an interactive user interfacing device 206. Any suitable interactive user interfacing device 206 capable of establishing two-way audio and visual communication between kiosk 200 and a service specialist station (not shown) via a network (not shown) may be used and should not be limited herein. Suitable interactive user interfacing devices 206 may include, but are not limited to, hand held electronic devices, mobile phones, tablet computers, laptop computers, desktop computers, personal digital assistants, smart TV's, the like, and/or any combinations thereof. Interactive user interfacing device 206 may be proximally located to a top surface 204 of inspection area 202. In an embodiment, interactive user interfacing device 206 may comprise an audio input device (e.g., a microphone, the like, and/or any combinations thereof), a visual input device (e.g., a camera, the like, and/or any combinations thereof), an audio output device (e.g., a speaker, the like, and/or any combinations thereof), a display screen, the like, and/or any combinations thereof. Optionally, the display screen (not shown) may be capable of displaying an interactive user interface utilized by an appointment management system before kiosk 200 and a service specialist station (not shown) establish a two-way communication connection. Optionally, the display screen may be capable of displaying two video images simultaneously. In an embodiment, the first displayed video image may be of the service specialist and the second displayed video image may be the view of the inspection area that the service specialist may have. The displayed video images may be in real-time. In an embodiment, the second displayed video image may be the images captured by an imaging device 208 of kiosk 200 and transmitted to the service specialist station. In another embodiment, the display screen may be capable of displaying guided videos that may allow the user to troubleshoot or service the electronic device without the need for a live service specialist. Optionally, the display screen may allow the user to engage with an artificial intelligence based diagnostic system that may allow the user to diagnose and service the electronic device without the aid of a service specialist. Any suitable guided videos and/or artificial intelligence based diagnostic system may be used and should not be limited herein.

Kiosk 200 may further comprise an imaging device 208. Imaging device may be disposed proximally to the top surface 204 of inspection area 202. Imaging device may comprise a visual input device including, but not limited to, a video camera, the like, and/or any combinations thereof. The visual input device may collect data from inspection area 202 and transmit the collected data to a service specialist station remotely located. The transmitted data may be displayed, in real-time, to the service specialist via the service specialist station. In an embodiment, the collected data may be simultaneously transmitted to an interactive user interfacing device 206 of kiosk 200 and displayed on a display screen for the user to view. This may allow the user to see the inspection area as the service specialist sees the inspection area in real-time. The data may be collected and transmitted in any suitable manner and should not be limited herein. In an embodiment, the service specialist may be capable of electronically adjusting the visual input device thereby providing the service specialist with the desired view. In an embodiment, the user may be capable of electronically and/or manually adjusting the visual input device thereby providing the service specialist with the desired view.

Kiosk 200 may further comprise a computing device 210. Any suitable computing device capable of analyzing software and electrical components of an electronic device may be used. Suitable computing devices 210 may include, but are not limited to, laptop computers, tablet computers, desktop computers, smart TV's, the like, and/or any combinations thereof. Computing device 210 may be disposed on kiosk 200 in a location inaccessible by the user. In a non-limiting example, computing device 210 may be disposed within a semi-permanent enclosure disposed on a bottom surface 222 of inspection area 202. In an embodiment, the user may connect an electronic device with the computing device 210. Computing device 210 may collect data regarding the software and electrical components of the electronic device. The collected data may be transmitted to a processing unit in the network (not shown). The processing unit may then analyze the collected data and produce a result and/or a plurality of results. The results may then be transmitted to the service specialist station and displayed for the service specialist. The service specialist may then determine the appropriate course of action. If the service specialist determines the electronic device is capable of being restored and/or repaired to its normal state at kiosk 200, the service specialist may then provide the user with step-by-step instructions on how to perform the repair and/or adjustments needed. Optionally, if the service specialist determines the electronic device is capable of being restored and/or repaired to its normal state at kiosk 200, with the introduction of advanced software or computer based techniques, the service specialist may then perform the repairs electronically via computing device 210. If the service specialist determines the electronic device is not capable of being repaired at kiosk 200, the service specialist may then proceed by providing the user with step-by-step instructions for replacing the electronic device with a replacement device stored within vessel 212. In certain embodiments, computing device 210 may be capable of installing software updates on an electronic device, restoring the electronic devices, resetting an electronic device, erasing personal content from an electronic device, reconfiguring an electronic device, pushing an electronic application, the like, and/or any combinations thereof. Computing device 210 may be any device capable of diagnosing, solving, and/or correcting software based issues that an electronic device may have.

Kiosk 200 may further comprise a vessel 212 capable of storing an electronic device and/or a plurality of electronic devices. As used herein, an electronic device may refer to a users device, a replacement device, the like, and/or any combinations thereof. Electronic devices may include, but are not limited to, tablet computers, laptop computers, mobile devices, personal digital assistant devices, the like, and/or any combinations thereof. As used herein, suitable mobile devices may include any device capable of utilizing a cellular signal. Suitable mobile devices may include, but are not limited to, a mobile cellular device, a tablet computer, a device comprising wireless hotspot capabilities, the like, and/or any combinations thereof. Vessel 212 may be disposed adjacent to inspection area 202. Vessel 212 may be coupled to base 216. Optionally, vessel 212 may not be connected to kiosk 200 but may be located within a given radius of kiosk 200. In a non-limiting example, vessel 212 may be located a reception desk within a given radius of kiosk 200. Vessel 212 may be described in greater detail below.

In a non-limiting embodiment, kiosk 200 may further comprise a vessel (not shown) capable of storing and dispensing SIM cards. In a non-limiting embodiment, kiosk 200 may further comprise a scanner (not shown) capable of analyzing the dispensed SIM card, such that the service specialist may be capable of determining if the correct SIM card was dispensed. In a non-limiting embodiment, kiosk 200 may further comprise a multiple port hub system (not shown) capable of allowing multiple electronic devices to be connected to the kiosk 200 such that kiosk 200 may be capable of performing diagnostics, charging, data erasure, connections, the like, and/or any combinations thereof, for the plurality of connected electronic devices.

Figure 3:
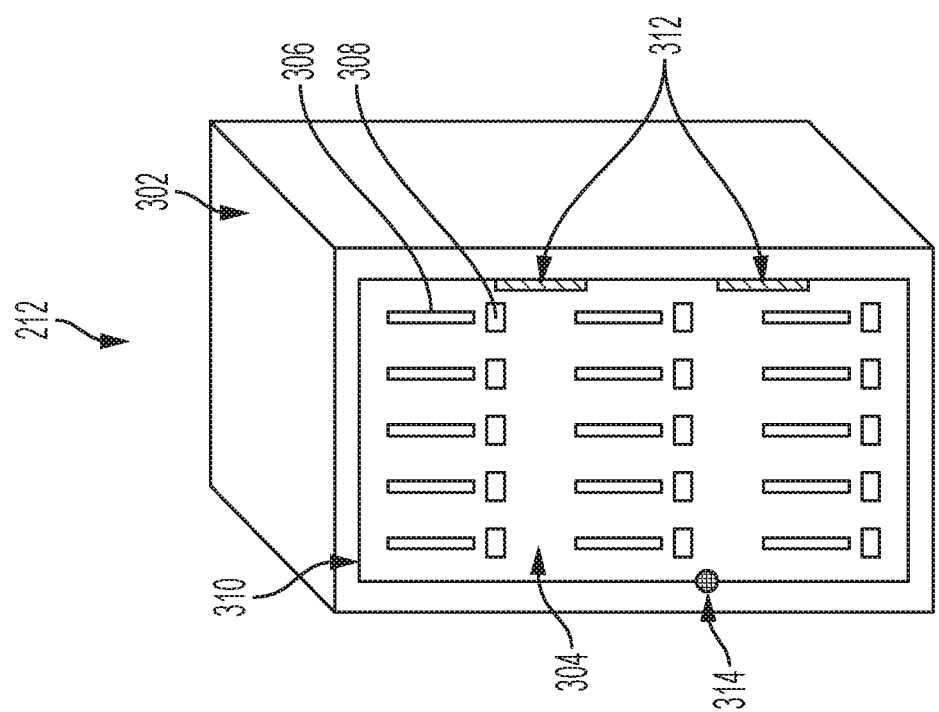
FIG. 3 illustrates an embodiment of vessel for use in a kiosk.

FIG. 3 illustrates an embodiment of vessel 212. Vessel 212 may be of any suitable size, geometry, material, combination of materials, the like, and/or any combinations thereof and should not be limited herein. Vessel 212 may comprise an outer body 302 and an inner body 304. In certain embodiments, the inner body 304 may be disposed within the outer body 302. The outer body 302 may be formed of any durable material and should not be limited herein. Durable material may include, but is not limited to, metals, steel, polymers, resins, elastomers, composite materials, the like, and/or any combinations thereof. Outer body 302 may be designed to store electronic devices therein and to limit a users access to the electronic devices stored therein. The inner body 304 may be formed of a material capable of storing and supporting an electronic device without damaging said device. Inner body 304 may be formed of foam. Any suitable foam may be used and should not be limited herein. Suitable foams may include, but are not limited to, dry fast foam, closed cell foam, open cell foam, memory foam, rebond foam, charcoal foam, latex rubber foam, high resilience foam, lux foam, high density foam, polyurethane foam, quantum foam, Styrofoam, polystyrene, phenolic, styrene, ethylene-vinyl acetate, polyethylene, toluene diisocyanate, methylene diphenyl diisocyanate, isocyanate, styrene, polyurea, pentane, derivatives thereof, the like, and/or any combinations thereof. The outer body 302 and the inner body 304 may be formed of any suitable material and/or materials and should not be limited herein.

In certain embodiments, inner body 304 may comprise an aperture 306 in which an electronic device (not shown) may be disposed therein. Aperture 306 may be of any suitable size and shape and should not be limited herein. The shape and size of aperture 306 may be dependent on the size and shape of the electronic device that is disposed therein. In an embodiment, inner body 304 may comprise a plurality of apertures 306, wherein each aperture 306 is capable of storing a single electronic device (not shown). Inner body 304 may comprise at least two apertures 306 or more. The number of apertures 306 in which inner body 304 may comprise may be dependent on the desired number of electronic devices to be disposed/stored therein. Optionally, each aperture may comprise an identification system 308. Any suitable identification system capable of allowing the service specialist to indicate to a user which aperture the service specialist is referring to may be used and should not be limited herein. Non-limiting examples of identification systems may include, numerical identification systems, light based identification systems, alphabetical identification systems, the like, and/or any combinations thereof. In an embodiment, the identification system 308 may be capable of automatically updating an electronic inventory accessible by the service specialist. Optionally, the electronic inventory may be manually updated by the service specialist in real-time as the inventory of the vessel is altered. The electronic inventory of the vessel 212 may be updated in any suitable manner and should not be limited herein. In an embodiment, each aperture 306 may comprise an acute pressure sensor (not shown) capable of detecting the presence of an electrical device disposed within aperture 306.

Vessel 212 may comprise a door 310 that may be pivotally connected to the outer body 302 of vessel 212 via an articulating joint 312 and/or a plurality of articulating joints 312, such that the door may be opened and closed. Any suitable articulating joint 312 may be used and should not be limited herein. Suitable articulating joints 312 may include, but are not limited to, a ball and socket joint, a hinge joint, a condyloid joint, a pivot joint, a gliding joint, a saddle joint, the like, and/or any combinations thereof.

Vessel 212 may further comprise a locking mechanism 314 such that user access to the electronic devices located within vessel 212 may be controlled. In an embodiment, the locking mechanism 314 may be electronically actuated by a service specialist located at a remote location. Locking mechanism 314 may comprise, an electromagnetic locking system, keyed locking systems, the like, and/or any combinations thereof. Suitable electromagnetic locking systems may include, but are not limited to, magnetic locks, electric door strikes, electric bolt locks, electronic keypad locks, radio frequency identification locks, the like, and/or any combinations thereof. Any suitable locking mechanism may be used and should not be limited herein. In an embodiment, each aperture 306 may comprise a door 310 and a locking mechanism 314 that may be remotely actuated by the service specialist. The door 310 may allow the service specialist to further restrict a users access to individual replacement devices and/or placement of disposed electronic devices within vessel 212.

Optionally, vessel 212 may further comprise additional hardware components required for diagnosing, solving, and/or repairing hardware related issues including, but not limited to, screens, batteries, charging ports, speakers, the like, and/or any combinations thereof. Vessel 212 may comprise a plethora of additional hardware components and should not be limited herein.

Accordingly, this disclosure describes methods and systems that may use the disclosed interactive help desk system. The methods, systems, and apparatuses may include any of the following statements:

Statement 1: A method comprising connecting a user, operating a kiosk, and a service specialist, operating a service specialist station, such that the service specialist is capable of supporting the user in servicing an electronic device from a remote location, the method comprising: engaging a portion of the kiosk; establishing a two-way communication connection between the kiosk and the service specialist station thereby allowing the user and the service specialist to interact in real time; allowing the service specialist to inspect the electronic device; determining a service the electronic device needs based on the results of the service specialists inspection; and servicing the device, wherein the service specialist guides the user through steps required for performing the determined service on the electronic device via step-by-step instructions.

Statement 2: The method of statement 1, wherein the determined service is repairing the electronic device.

Statement 3: The method of statement 1 or 2, wherein the determined service is replacing the electronic device.

Statement 4: The method of any of the proceeding statements, further comprising: selecting a replacement device from a kiosk inventory; transferring stored data from the electronic device to the replacement device, wherein the service specialist provides instructions in real-time to the user for transferring the stored data; disposing the electronic device in a designated location indicated by the service specialist after the transfer of stored data is complete; disengaging the kiosk.

Statement 5: The method of any of the proceeding statements, wherein selecting the replacement device further comprises: reviewing an inventory of replacement devices stored within a vessel of the kiosk to determine which replacement device the user will obtain; instructing the user to remove the determined replacement device from the vessel; and allowing the user to remove the determined replacement device from the vessel.

Statement 6: The method of any of the proceeding statements, wherein the service specialist controls the users access to the kiosk inventory via an electronically actuated locking mechanism disposed within the vessel.

Statement 7: The method of any of the proceeding statements, wherein the electronically actuated locking mechanism is remotely actuated by the service specialist.

Statement 8: The method of any of the proceeding statements, wherein the disposed electronic devices are removed from the kiosk and recycled at an off-site location.

Statement 9: The method of any of the proceeding statements, wherein the service specialist inspects the electronic devices by at least one of visual inspection, computational analysis, and any combinations thereof.

Statement 10: The method of any of the proceeding statements, wherein the service specialist supports the user in servicing the electronic device in real-time.

Statement 11: The method of any of the proceeding statements, further comprising: placing the user in a virtual waiting room after the user engages a portion of the kiosk; notifying the service specialist that the user is in the virtual waiting room, wherein the service specialist accepts the appointment thereby activating a remaining portion of the kiosk.

Statement 12: A kiosk capable of establishing a two-way communication connection with a service specialist station located at a remote location, the kiosk comprising: an inspection area; a vessel disposed adjacent to the inspection area capable of storing a plurality of electronic devices; an imaging device disposed proximal to a top surface of the inspection area capable of collecting data from the inspection area and transmitting the data to a service specialist real-time; an interactive user interfacing device disposed proximal to the top surface of the inspection area capable of establishing a two-way communication connection between a user and the service specialist in real-time; and a computing device disposed proximal to the inspection area inaccessible by the user, wherein the computing device is capable of analyzing software and electrical components of an electronic device.

Statement 13: The kiosk of statement 12, wherein the vessel further comprises: an outer body; an inner body disposed within the outer body; a plurality of apertures disposed within the inner body, wherein each aperture is capable of physically supporting the electronic device disposed therein; a door pivotally coupled to a portion of the outer body via an articulating joint; a locking mechanism disposed within a portion of the door transversely from the articulating joint capable of controlling the users access to the electronic device disposed within the vessel.

Statement 14: The kiosk of statement 12 or 13, wherein the locking mechanism is remotely actuated by a service specialist operating the service specialist station.

Statement 15: The kiosk of any of the proceeding statements, further comprising an identification system in which each aperture is identified and distinguished from one another.

Statement 16: The kiosk of any of the proceeding statements, wherein the imaging device is capable of collecting and transmitting data selected from the group consisting of video data, visual data, audio data, and any combinations thereof.

Statement 17: The kiosk of any of the proceeding statements, wherein the plurality of electronic devices comprise at least one device selected from the group consisting of tablet computers, laptop computers, mobile devices, personal digital assistant devices, and any combinations thereof.

Statement 18: An interactive help desk system comprising: a kiosk operated by a user located at a first location; a service specialist station operated by a service specialist located at a second location, wherein the second location is remotely located from the first location; a network capable of communicably connecting the kiosk and the service specialist station.

Statement 19: The interactive help desk system of statement 18, wherein the kiosk further comprises: an inspection area; a vessel disposed adjacent to the inspection area capable of storing a plurality of electronic devices, the vessel further comprising: an outer body; an inner body disposed within the outer body; a plurality of apertures disposed within the inner body, wherein each aperture is capable of physically supporting the electronic device disposed therein; a door pivotally coupled to a portion of the outer body via an articulating joint; a locking mechanism disposed within a portion of the door transversely from the articulating joint capable of controlling the users access to the electronic device disposed within the vessel; an imaging device disposed proximal to a top surface of the inspection area capable of collecting data from the inspection area and transmitting the data to a service specialist real-time; an interactive user interfacing device disposed proximal to the top surface of the inspection area capable of establishing a two-way communication connection between a user and the service specialist in real-time; and a computing device disposed proximal to the inspection area inaccessible by the user, wherein the computing device is capable of analyzing software and electrical components of an electronic device.

Statement 20: The interactive help desk system of statement 18 or 19, wherein the service specialist station is capable of establishing two-way communication connection between the service specialist and the user in real-time.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

The above disclosed embodiments have been presented for purposes of illustration and to enable one of ordinary skill in the art to practice the disclosed embodiments, but is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification.

What is claimed is:

1. A method for supporting a user in servicing an electronic device at a kiosk by a service specialist operating a service specialist station from a remote location, the method comprising:
    engaging a portion of the kiosk by the user;
    placing the user in a virtual waiting room after the user engages the portion of the kiosk;
    establishing a two-way audio and visual communication connection between the kiosk and the service specialist station via an interactive user interfacing device, thereby allowing the user and the service specialist located at the remote location to interact in real time via concurrent audio and visual communications;
    placing the electronic device within an inspection area of the kiosk;
    allowing the service specialist to inspect the electronic device via an imaging device disposed proximal to a top surface of the inspection area, wherein the service specialist's inspection further comprises:
        connecting the electronic device to a port hub system of the kiosk such that the kiosk performs computational analysis for the electronic device;
    determining whether the electronic device is capable of being serviced remotely;
    in response to determining that the electronic device is capable of being serviced remotely, determining a service that the electronic device needs based on the results of the service specialist's inspection;
    further in response to determining that the electronic device is capable of being serviced remotely, servicing the electronic device while maintaining the concurrent audio and visual communications, wherein the service specialist guides the user via the concurrent audio and visual communications through steps required for performing the determined service on the electronic device via step-by-step audio and visual instructions;
    in response to determining that the electronic device is not capable of being serviced remotely, providing the user with step-by-step instructions for replacing the electronic device with a replacement device stored within the kiosk; and
    further in response to determining that the electronic device is not capable of being serviced remotely:
        selecting the replacement device from a kiosk inventory stored in a vessel of the kiosk;
        transferring stored data from the electronic device to the replacement device, wherein the service specialist provides instructions in real-time to the user for transferring the stored data;
        disposing the electronic device in a designated location indicated by the service specialist after the transfer of stored data is complete; and
        disengaging the kiosk.

2. The method of claim 1, wherein the determined service is repairing the electronic device.

3. The method of claim 1, wherein selecting the replacement device further comprises:
    reviewing an inventory of replacement devices stored within the vessel of the kiosk to determine which replacement device the user will obtain;
    instructing the user to remove the determined replacement device from the vessel; and
    allowing the user to remove the determined replacement device from the vessel.

4. The method of claim 3, wherein the service specialist controls the user's access to the kiosk inventory via an electronically actuated locking mechanism disposed within the vessel.

5. The method of claim 4, wherein the electronically actuated locking mechanism is remotely actuated by the service specialist.

6. The method of claim 1, wherein the disposed electronic devices are removed from the kiosk and recycled at an off-site location.

7. The method of claim 1, wherein the computational analysis comprises diagnostics, charging, data erasure, connections, or any combinations thereof.

8. The method of claim 1, wherein the service specialist supports the user in servicing the electronic device in real-time.

9. The method of claim 1, wherein the service specialist accepts the appointment thereby activating a remaining portion of the kiosk.

10. A kiosk for establishing a two-way communication connection with a service specialist station located at a remote location, the kiosk comprising:
    an inspection area;
    a vessel disposed adjacent to the inspection area that stores at least one replacement device;
    an interactive user interfacing device disposed proximal to the top surface of the inspection area that establishes a two-way audio and visual communication connection between a user and a service specialist located at the service specialist station in real-time via concurrent audio and visual communications, wherein the interactive user interfacing device is configured to:
        permit the user and the service specialist to interact in real time via concurrent audio and visual communications;
        permit an electronic device to be serviced while maintaining the concurrent audio and visual communications;
    an imaging device disposed proximal to a top surface of the inspection area that collects electronic device data from the inspection area and transmits the electronic device data to the service specialist in real-time;
    a port hub system that establishes a connection between the electronic device and a computing device disposed proximal to the inspection area inaccessible by the user wherein the computing device performs computational analysis for the electronic device in response to the connection;
    wherein, in response to such analysis, the computing device determines whether the electronic device is capable of being serviced;

in response to determining that the electronic device is capable of being serviced, the computing device determining a service that the electronic device needs;

further in response to the computing device determining that the electronic device is capable of being serviced, servicing the electronic device while maintaining the concurrent audio and visual communications, wherein the service specialist guides the user via the concurrent audio and visual communications through steps required for performing the determined service on the electronic device via step-by-step audio and visual instructions;

in response to the computing device determining that the electronic device is not capable of being serviced remotely, providing the user with step-by-step instructions for replacing the electronic device with a respective one of the at least one replacement device stored within the vessel; and further in response to determining that the electronic device is not capable of being serviced remotely:
  selecting a respective one of the at least one replacement device from a kiosk inventory stored in the vessel of the kiosk;
  transferring stored data from the electronic device to the respective replacement device, wherein the service specialist provides instructions in real-time to the user for transferring the stored data;
  disposing the electronic device in a designated location indicated by the service specialist after the transfer of stored data is complete; and
  disengaging the kiosk.

11. The kiosk of claim 10, wherein the vessel further comprises:
  an outer body;
  an inner body disposed within the outer body;
  a plurality of apertures disposed within the inner body, wherein each aperture is capable of physically supporting a respective one of the at least one replacement device disposed therein;
  a door pivotally coupled to a portion of the outer body via an articulating joint;
  a locking mechanism disposed within a portion of the door transversely from the articulating joint capable of controlling the user's access to the at least one replacement device disposed within the vessel.

12. The kiosk of claim 11, wherein the locking mechanism is remotely actuated by the service specialist operating the service specialist station.

13. The kiosk of claim 11, further comprising an identification system in which each aperture is identified and distinguished from one another.

14. The kiosk of claim 10, wherein the imaging device is capable of collecting and transmitting electronic device data selected from the group consisting of video data, visual data, audio data, or any combinations thereof.

15. The kiosk of claim 10, wherein the at least one replacement device comprises at least one device selected from the group consisting of tablet computers, laptop computers, mobile devices, personal digital assistant devices, or any combinations thereof.

16. An interactive help desk system comprising:
  a kiosk comprising an inspection area and operated by a user located at a first location;
  a service specialist station operated by a service specialist located at a second location, wherein the second location is remotely located from the first location;
  an imaging device disposed proximal to a top surface of the inspection area that collects electronic device data from the inspection area and transmits the electronic device data to the service specialist in real-time;
  a port hub system that establishes a connection between the electronic device and a computing device disposed proximal to the inspection area inaccessible by the user wherein the computing device performs computational analysis for the electronic device in response to the connection;
  an interactive user interfacing device disposed proximal to the top surface of the inspection area that establishes a two-way audio and visual communication connection between a user and the service specialist in real-time, wherein the interactive user interfacing device is configured to:
  permit the user and the service specialist to interact in real time via concurrent audio and visual communications;
  permit an electronic device to be serviced while maintaining the concurrent audio and visual communications;
  permit the service specialist to guide the user via the concurrent audio and visual communications through steps required for performing a determined service on the electronic device via step-by-step audio and visual instructions;
  determine whether the electronic device is capable of being serviced remotely;
  in response to determining that the electronic device is capable of being serviced remotely, determine a service that the electronic device needs based on the results of the service specialist's inspection;
  further in response to determining that the electronic device is capable of being serviced remotely, service the electronic device while maintaining the concurrent audio and visual communications, wherein the service specialist guides the user via the concurrent audio and visual communications through steps required for performing the determined service on the electronic device via step-by-step audio and visual instructions;
  in response to determining that the electronic device is not capable of being serviced remotely, provide the user with step-by-step instructions for replacing the electronic device with a respective one of at least one replacement device stored within the kiosk;
  further in response to determining that the electronic device is not capable of being serviced remotely:
    selecting a respective one of the at least one replacement device from a kiosk inventory stored in a vessel of the kiosk;
    transferring stored data from the electronic device to the respective replacement device, wherein the service specialist provides instructions in real-time to the user for transferring the stored data;
    disposing the electronic device in a designated location indicated by the service specialist after the transfer of stored data is complete; and
    disengaging the kiosk; and
  a network configured to audibly and visually connect the kiosk and the service specialist station.

17. The interactive help desk system of claim 16, wherein the kiosk further comprises:
  the vessel, the vessel further comprising:
    an outer body;
    an inner body disposed within the outer body;

a plurality of apertures disposed within the inner body, wherein each aperture is capable of physically supporting a respective one of the at least one electronic device disposed therein;

a door pivotally coupled to a portion of the outer body via an articulating joint;

a locking mechanism disposed within a portion of the door transversely from the articulating joint capable of controlling the user's access to the electronic device disposed within the vessel.

18. The interactive help desk system of claim 16, wherein the service specialist station establishes a two-way communication connection between the service specialist and the user in real-time.

* * * * *